United States Patent [19]
Tomasko et al.

[11] Patent Number: 5,499,649
[45] Date of Patent: Mar. 19, 1996

[54] PRESSURE SURGE RESISTANT RUPTURE DISK ASSEMBLY

[75] Inventors: John A. Tomasko, Claremore; Stephen P. Farwell, Owasso, both of Okla.

[73] Assignee: BS&B Safety Systems, Inc., Tulsa, Okla.

[21] Appl. No.: 345,118

[22] Filed: Nov. 28, 1994

Related U.S. Application Data

[63] Continuation-in-part of Ser. No. 106,447, Aug. 16, 1993, Pat. No. 5,377,716.

[51] Int. Cl.$^6$ ............................ F16K 17/40; F16K 47/14
[52] U.S. Cl. ..................... 137/68.27; 220/89.2; 251/127
[58] Field of Search ........................... 137/68.24, 68.27, 137/68.28; 220/89.2; 251/127

[56] References Cited

U.S. PATENT DOCUMENTS

| | | | |
|---|---|---|---|
| 2,953,279 | 9/1960 | Coffman | 220/89 |
| 2,954,897 | 10/1960 | Hansen et al. | 220/89 |
| 3,072,284 | 1/1963 | Luhman, Jr. | 220/44 |
| 3,091,359 | 5/1963 | Wood | 220/89 |
| 3,445,032 | 5/1969 | Raidl, Jr. et al. | 220/89 |
| 3,696,958 | 10/1972 | Lee | 215/56 |
| 3,698,598 | 10/1972 | Wood et al. | 220/89 A |
| 3,704,807 | 12/1972 | Lidgard | 220/89 A |
| 3,881,629 | 5/1975 | Shaw et al. | 220/89 A |
| 4,434,905 | 3/1984 | Ou et al. | 220/89 A |
| 4,512,491 | 4/1985 | DeGood et al. | 220/89 A |
| 4,777,974 | 10/1988 | Swift et al. | 137/14 |
| 4,809,729 | 3/1989 | Muddiman | 137/68.1 |
| 4,905,722 | 3/1990 | Rooker et al. | 137/68.1 |
| 5,002,085 | 3/1991 | FitzGerald | 137/68.1 |

*Primary Examiner*—John Rivell
*Attorney, Agent, or Firm*—Dougherty, Hessin, Beavers & Gilbert

[57] ABSTRACT

The present invention provides a pressure surge resistant rupture disk assembly adapted to be sealingly clamped across a pressurized fluid containing passageway. The assembly basically comprises first and second rupture members having predetermined rupture pressures and means disposed between the first and second rupture members for providing a space for containing pressurized fluid within the assembly and for supporting the second rupture member against the first rupture member during a momentary pressure surge. The second rupture member faces the pressurized fluid and has at least one opening therein for allowing a restricted pressurized fluid flow therethrough.

22 Claims, 4 Drawing Sheets

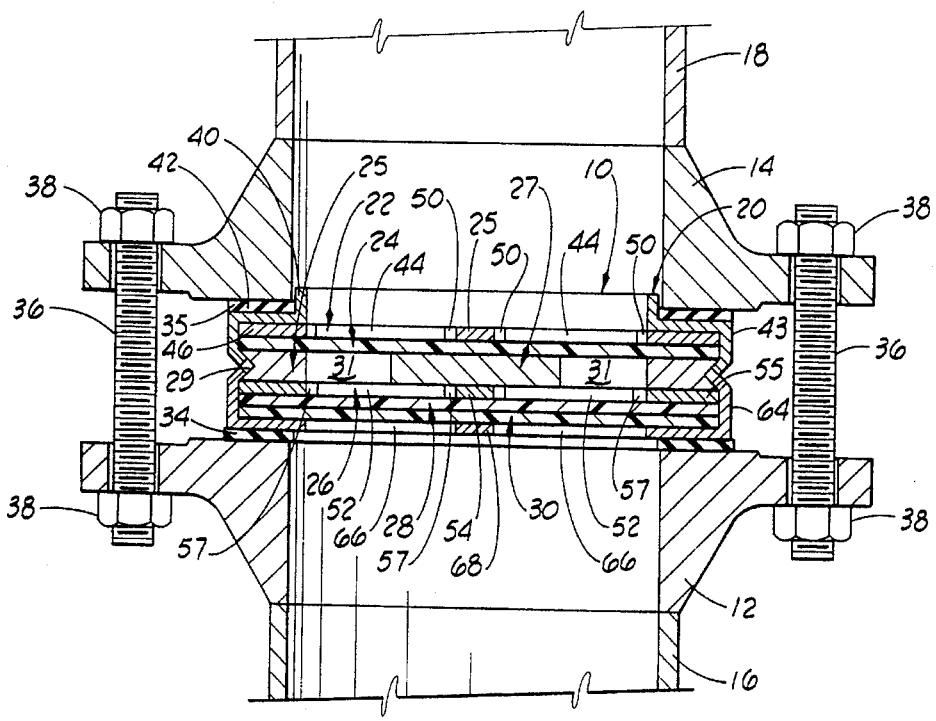
FIG. 1
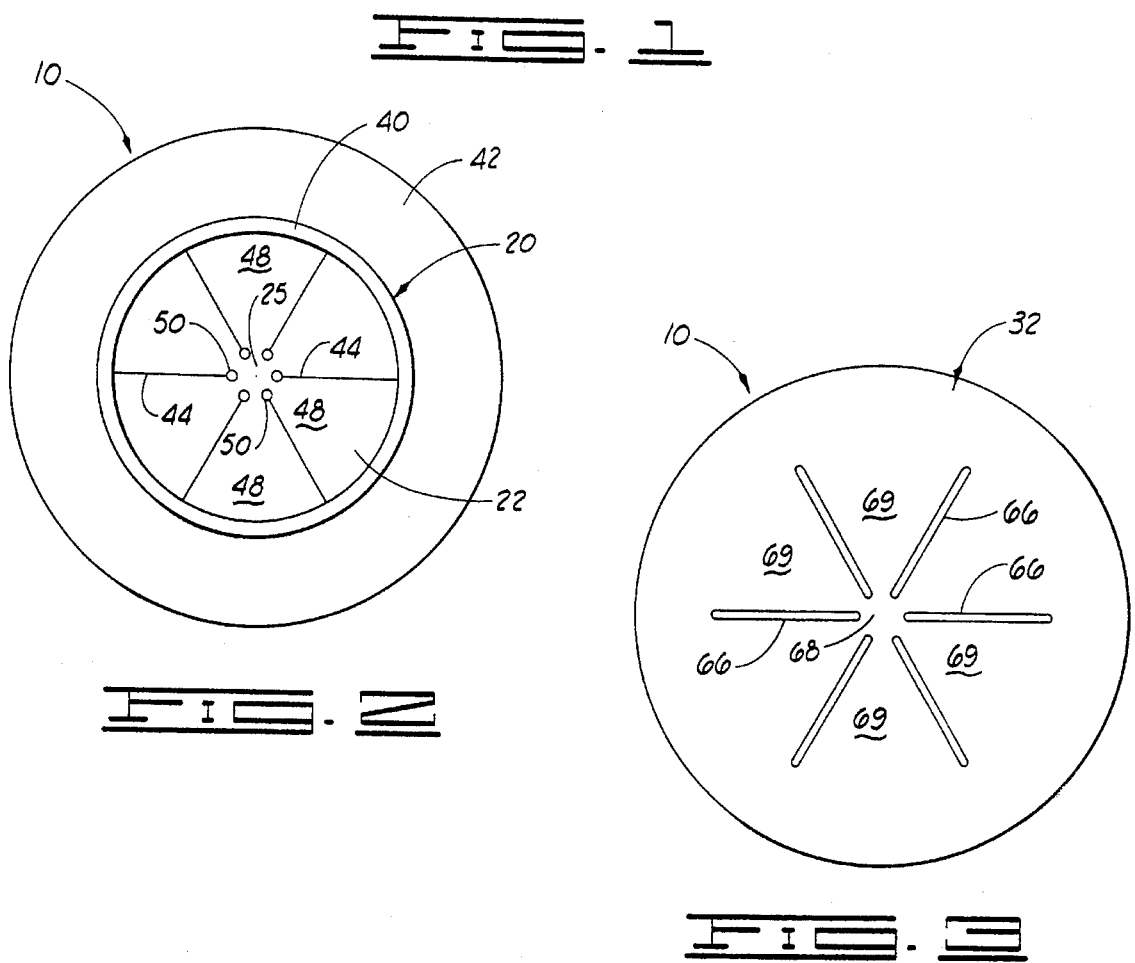
FIG. 2
FIG. 3

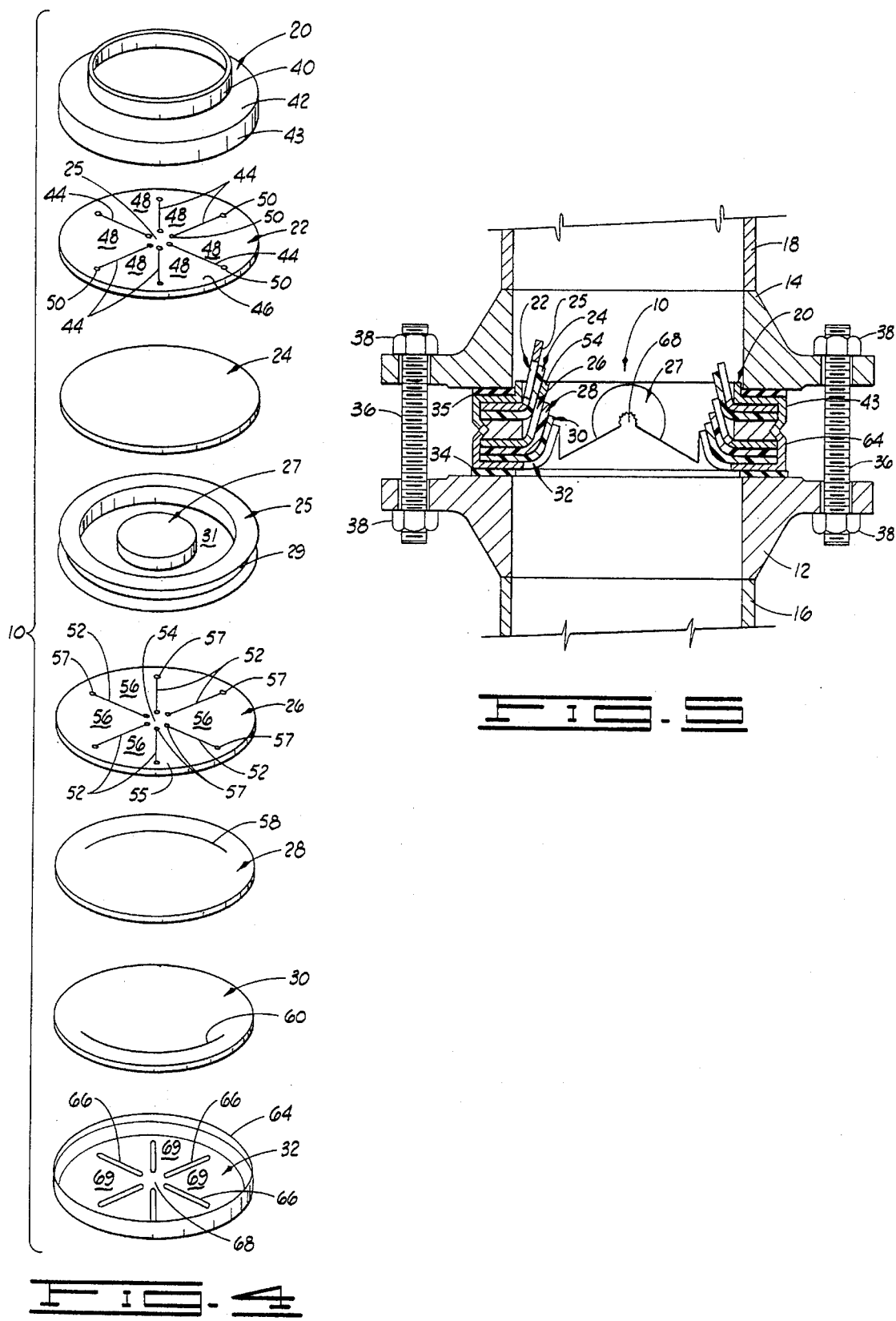

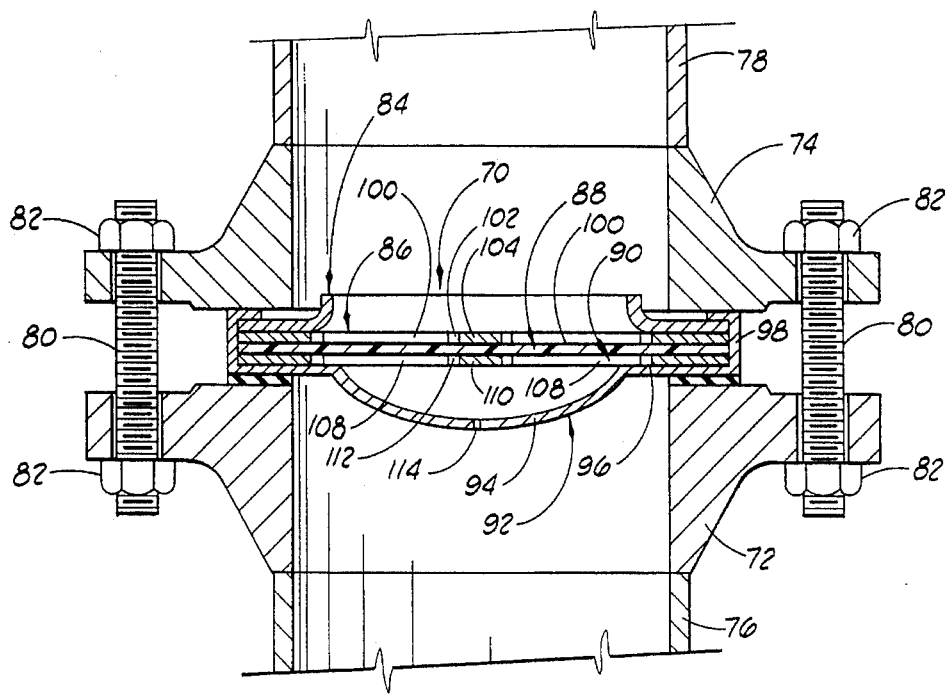
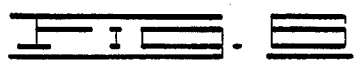
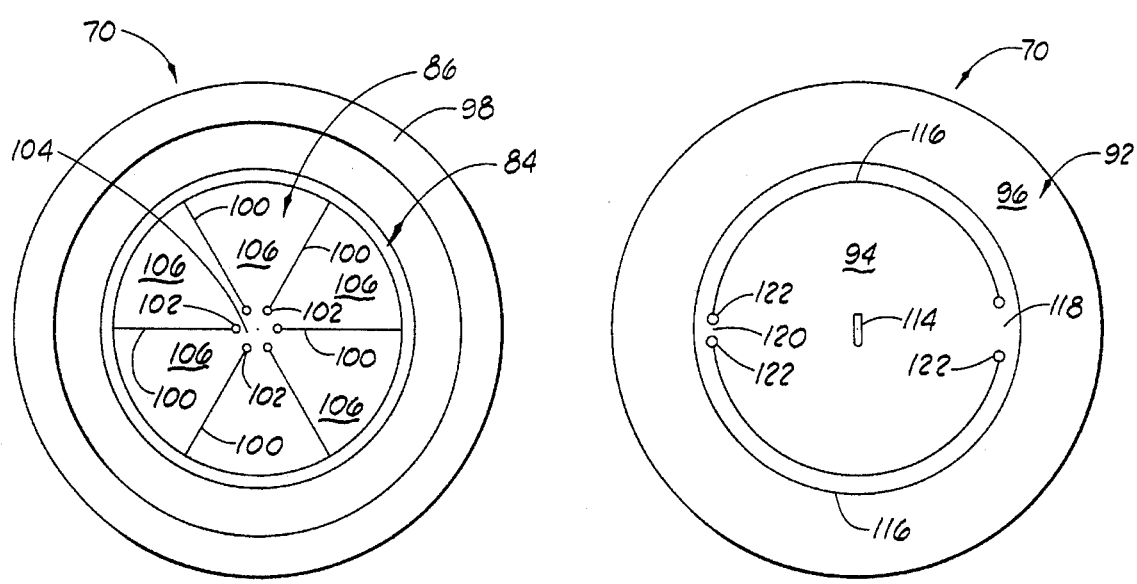
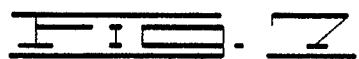 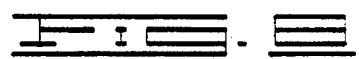

PRESSURE SURGE RESISTANT RUPTURE DISK ASSEMBLY

This application is a continuation-in-part of application Ser. No. 08/106,447 filed Aug. 16, 1993, now U.S. Pat. No. 5,377,716.

BACKGROUND OF THE INVENTION

1. Field of the Invention

The present invention relates generally to rupturable pressure relief devices, and more particularly, to rupture disk assemblies which resist momentary pressure surges.

2. Description of the Prior Art

A variety of rupturable pressure relief devices have been developed and used heretofore. Commonly, such devices include a rupture member or disk which is of a particular strength whereby it ruptures when a predetermined fluid pressure is exerted thereon. The rupture disk is most often clamped between a pair of annular supporting members positioned in a pressure relief passageway or conduit connected to a vessel or system being protected from overpressure by the rupture disk.

While rupture disk assemblies comprised of a single rupture disk supported between supporting members are commonly utilized in particular applications, composite rupture disk assemblies comprised of two or more rupturable parts supported between supporting members are also commonly used. An example of a particular type of composite rupture disk assembly is comprised of a perforated rupture member formed of metal or other rigid material with a resilient sealing member positioned adjacent thereto. Other parts such as protection members for the resilient sealing member and additional perforated rupture members are often also included in the composite rupture disk assembly. A composite rupture disk assembly can include means for clamping the various parts together, and the entire assembly is adapted to be clamped between a pair of annular supporting members such as pipe flanges or the like.

The prior art rupture disk assemblies including single rupture disks or composite rupture disks have been highly commercially successful in a variety of overpressure protection applications. However, in applications where the vessel or system being protected is subject to momentary surges in pressure which exceed the predetermined rupture pressure of the rupture disk, less than desirable results often result. For example, when a pressurized liquid, such as liquified petroleum gas, is transported in a tank truck or tank car, a sudden tank movement or stop causes the pressurized liquid to move within the tank which in turn causes a momentary surge in pressure within the tank. When a heretofore utilized rupture disk assembly is subjected to such a pressure surge and the surge causes a momentarily overpressure condition to be exerted thereon, the rupture disk assembly ruptures even though pressure relief from the vessel or system being protected is not required.

Thus, there is a need for a rupture disk assembly which will resist rupture when an overpressure condition is momentarily caused by a momentary pressure surge within a vessel or system being protected, but when an overpressure condition is reached slowly, the rupture disk assembly ruptures and provides needed pressure relief.

SUMMARY OF THE INVENTION

The present invention provides pressure surge resistant rupture disk assemblies and methods which meet the above described need and overcome the shortcomings of the prior art. A pressure surge resistant rupture disk assembly of the invention is adapted to be sealingly clamped in a pressurized fluid containing passageway which is in turn connected to a vessel or system containing pressurized fluid. The rupture disk assembly is basically comprised of a first rupture member having a predetermined rupture pressure, and a second rupture member having a predetermined rupture pressure which is preferably substantially equal to or lower than the rupture pressure of the first rupture member and having at least one opening therein for allowing a restricted pressurized fluid flow therethrough. Means for providing a space for containing pressurized fluid within the assembly and for supporting the second rupture member against the first rupture member during a momentary pressure surge are disposed between the first and second rupture members. Also, at least one flow restricting member having an opening therein for further restricting pressurized fluid flow into the assembly is positioned on the side of the second rupture member facing the pressurized fluid. When a momentary pressure surge which causes a momentary overpressure condition is exerted on the rupture disk assembly, the assembly does not rupture because the overpressure is exerted on both the first and second rupture members simultaneously as a result of the restriction in pressurized fluid flow into the assembly.

It is, therefore, a general object of the present invention to provide momentary pressure surge resistant rupture disk assemblies and methods.

Other and further objects, features and advantages of the present invention will be readily apparent to those skilled in the art upon a reading of the description of preferred embodiments which follows when taken in conjunction with the accompanying drawings.

BRIEF DESCRIPTION OF THE DRAWINGS

FIG. 1 is a side cross-sectional view of a rupture disk assembly of the present invention clamped between a pair of annular supporting members.

FIG. 2 is a top view of the rupture disk assembly shown in FIG. 1.

FIG. 3 is a bottom view of the rupture disk assembly of FIG. 1.

FIG. 4 is an exploded perspective view showing the various parts of the rupture disk assembly of FIG. 1.

FIG. 5 is a side cross-sectional view similar to FIG. 1 but showing the rupture disk assembly after rupture has taken place.

FIG. 6 is a side cross-sectional view of an alternate form of rupture disk assembly of the present invention clamped between annular supporting members.

FIG. 7 is a top view of the rupture disk assembly of FIG. 6.

FIG. 8 is a bottom view of the rupture disk assembly of FIG. 6.

DESCRIPTION OF PREFERRED EMBODIMENTS

Figure 9:
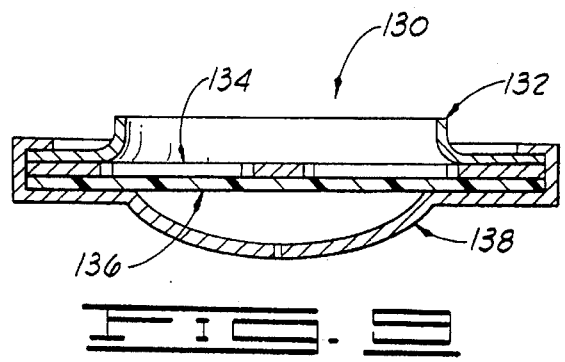
FIG. 9 is a side cross-sectional view of another alternate form of rupture disk assembly of this invention.

Referring now to the drawings and particularly to FIGS. 1-5, the composite rupture disk assembly of the present invention is illustrated and generally designated by the numeral 10. The assembly 10 is illustrated sealingly clamped between a pair of annular support members in the form of inlet and outlet pipe flanges 12 and 14. Inlet flange 12 is sealingly connected to a conduit 16 which is in turn connected to a vessel or system containing pressurized fluid. Outlet flange 14 is connected to a conduit 18 which leads pressurized fluid relieved by the rupture disk assembly 10 to a location of containment or disposal.

The assembly 10 is comprised of an annular positioning and clamping member 20, a first rupture member 22, a resilient sealing member 24, an annular spacer member 25, a second rupture member 26, a cylindrical support member 27, a first flow restricting member 28, a second flow restricting member 30 and a support and clamping member 32. A pair of conventional gaskets 34 and 35 are positioned between the rupture disk assembly 10 and the inlet and outlet flanges 12 and 14, respectively, to insure a seal therebetween. The inlet and outlet flanges 12 and 14 are clamped together with the rupture disk assembly 10 and gaskets 34 and 35 therebetween by a plurality of studs 36 and nuts 38.

As best shown in FIG. 4, the positioning and clamping member 20 is formed of a rigid material and includes an optional central upstanding portion 40 connected to an annular flat flange portion 42. The optional upstanding portion 40 functions to position the assembly in the annular supporting members between which it is clamped, e.g., the flanges 12 and 14, and to protect the rupture member 22 from damage during handling and installation. The member 20 also includes a peripheral portion which is folded downwardly to form a lip portion 43. Upon assembly of the various parts of the assembly 10, the lip portion 43 of the member 20 extends over the outer peripheral portions of the members 22, 24 and 25 and is folded into a triangular recess 29 formed in the peripheral side of the member 25 as shown in FIG. 1.

In the form illustrated, the first rupture member 22 is a substantially circular section of flat rigid material. A plurality of elongated slits 44 are formed in the rupture member 22 which extend radially outwardly from a solid central portion 25 towards the periphery of the member 22. The slits 44 are equally spaced around the member 22 and terminate interiorally of the periphery whereby an annular flat solid flange portion 46 remains in the rupture member 22 and the slits 44 define a plurality of sector shaped portions 48 in the rupture member 22. For ease of manufacturing and to avoid sharp projections, apertures 50 may be provided at each of the ends of the slits 44. However, the apertures 50 are optional and may be omitted. Also, slots may optionally be utilized instead of the slits 44.

Positioned adjacent the first rupture member 22 on the opposite side thereof from the positioning member 20 is the resilient sealing member 24. The resilient sealing member 24 is generally formed of a resilient corrosion resistant plastic material and is of a peripheral size and shape corresponding with the peripheral size and shape of the first rupture member 22.

Positioned adjacent the resilient sealing member 24 on the opposite side thereof from the first rupture member 22 is the annular spacer member 25. The spacer member 25 is included in the assembly 10 to provide a volumetric space 31 therein, the purpose of which is to provide a space for containing pressurized fluid within the assembly 10 as will be described hereinbelow. As mentioned above, the peripheral side of the spacer member 25 includes a triangular recess 29 therein into which the lip portion 43 of the member 20 is folded.

Disposed within the space 31 in the spacer member 25 is the cylindrical support member 27, the purpose of which is to provide a support between the second rupture member 26 and the resilient sealing member 24 as will also be described hereinbelow. The cylindrical support member is positioned centrally within the spacer member 25 and is preferably bonded to the surface of the resilient sealing member 24 adjacent thereto.

Positioned adjacent to the annular spacer member 25 and the cylindrical support member 27 is the second rupture member 26 which is formed of flat rigid material. In the form shown, the second rupture member 26 is identical to the first rupture member 22 in that it includes a plurality of slits 52 which radiate outwardly from a solid central portion 54 and define an annular flat solid flange portion 55 and a plurality of sector shaped portions 56 in the second rupture member 26. Apertures 57 are provided at the ends of the slits 52. While the predetermined rupture pressures of the first and second rupture members can be different with either one being greater than the other, the second rupture member 26 preferably has a predetermined rupture pressure which is substantially equal to or less than the predetermined rupture pressure of the first rupture member 22.

The first flow restricting member 28 is positioned adjacent the second rupture member 26 on the side thereof opposite from the annular spacer member 25 and the support member 27. In the form illustrated, the first flow restricting member is formed of a resilient plastic material such as that forming the sealing member 24 and an arcuate slit 58 is disposed in the member 28 near a peripheral side portion thereof.

The second flow restricting member 30 is also formed of resilient plastic material and is positioned adjacent the first flow restricting member 28 on the side thereof opposite from the second rupture member 26. The member 30 includes an arcuate slit 60 formed therein near a peripheral side portion thereof opposite from the peripheral side portion of the member 28 in which the slit 58 is disposed.

The support member 32 is a flat circular member formed of a rigid material. A peripheral portion of the support member 32 is folded upwardly to form an annular lip 64. Upon assembly of the various parts of the assembly 10, the lip portion 64 is folded over the outer peripheral edges of the members 26, 28 and 30 and into the triangular recess 29 of the spacer member 25 as illustrated in FIG. 1 whereby the members are held together. The central flat circular portion of the support member 32 includes a plurality of slots 66 which radiate outwardly from a solid central portion 68 and terminate near the periphery of the member 32. The slots 66 define a plurality of sector shaped portions 69 in the member 32 which are positioned to coincide with the sector shaped portions 48 and 56 defined in the first and second rupture members 22 and 26, respectively.

As mentioned above, the inclusion of the upstanding positioning portion 40 of the member 20 is optional. Also, the support member 32 can take a variety of forms other than the form illustrated, and the various members in the assembly 10 can be clamped or held together in a variety of ways different from that described above. The flanges 12 and 14 include raised face portions which coact with the annular flange portions of the assembly 10. When the upstanding positioning portion 40 of the member 20 is included, the portion 40 extends within the annular flange 14 to thereby position the assembly 10 within the flanges 12 and 14 during installation.

In the operation of the assembly 10, fluid pressure from the vessel or system being protected is exerted on the resilient sealing member 24 of the assembly 10 by way of the conduit 16, the inlet flange 12, the slots 66 of the support member 32, the slit 60 of the second flow restricting member 30, the slit 58 of the first flow restricting member 28, the slits 52 and apertures 57 of the second rupture member 26 and the annular space 31 within the assembly 10 between the interior of the annular spacer member 25 and the exterior of the cylindrical support member 27. When the fluid pressure reaches the resilient sealing member 24, the sealing member 24 is pressed against the first rupture member 22. If the pressure exerted on the sealing member 24 and first rupture member 22 exceeds the predetermined rupture pressure of the rupture member 22, the rupture member 22 ruptures to relieve pressurized fluid through the assembly 10 as will be described further hereinbelow.

If a reverse pressure differential is temporarily exerted on the assembly 10 due to the exertion of pressure by way of the conduit 18 which is greater than the pressure exerted on the assembly 10 by way of the conduit 16, the reverse pressure is communicated to the sealing member 24 by way of the slits 44 and apertures 50 in the first rupture member 22 and the sealing member 24 is pressed against the second rupture member 26 by way of the support member 27. In such reverse pressure situations, the support member 32 supports the second rupture member 26 as well as the first and second flow restricting members 28 and 30 and prevents the reverse rupture of the assembly 10.

As indicated, the fluid pressure exerted on the assembly 10 from the pressure vessel or system being protected is exerted on the first rupture member 22 by the sealing member 24. As a result, the first rupture member 22 is placed in tension and when the fluid pressure relatively slowly increases to an overpressure condition and reaches the rupture pressure of the first rupture member 22 whereby the tensile strength of a solid portion of the rupture member 22 between two of the apertures 50 at the inner ends of the slits 44 is exceeded, the rupture member 22 ruptures by first tearing between the two apertures 50 and then tearing between the remaining apertures except for the two which are the farthest apart. Because of manufacturing variances in the lengths of the solid portions between the apertures 50 at the inner ends of the slits 44, all of the solid portions tear except the one having the greatest length and the central portion 25 of the rupture member 22 remains attached to one of the sector shaped portions 48 as shown in FIG. 5. When the rupture member 22 ruptures, the resilient sealing member 24 also ruptures causing pressure to be relieved through the assembly 10. The force of the pressure release, i.e., the flow of pressurized fluid through the assembly 10, causes the second rupture member 26 to rupture, the first and second flow restricting members 28 and 30 to rupture and the support member 32 to rupture, all as shown in FIG. 5. As in the case of the first rupture member 22, the central portion 54 of the second rupture member 26 and the central portion 68 of the support member 32 remain attached. As illustrated in FIG. 5, after rupture and initial pressure release, the composite rupture disk assembly 10 is fully opened with the sector shaped portions 48 of the first rupture member 22, the sector shaped portions 56 of the second rupture member 26 and the sector shaped portions formed by the slots 66 of the support member 32 bent upwardly providing full pressure relief to the pressure vessel or system being protected. Upon rupture, the resilient sealing member 24 and the resilient first and second flow restricting members 28 and 30 also rupture in sector shaped portions substantially similar to the sector shaped portions of the first and second rupture members 22 and 26 and support member 32. When the cylindrical support member 27 is bonded to the resilient sealing member 24, it remains attached to a portion of the resilient sealing member 24 as shown.

In order to eliminate the trial and error techniques required in manufacturing the first and second rupture members 22 and 26 whereby they have desired predetermined rupture pressures, scores can be formed in the rupture members between two of the apertures at the inner ends of the slits thereof to control the rupture pressure as described in U.S. Pat. No. 4,905,722 issued on Mar. 6, 1990 to Rooker et al. which is incorporated herein by reference.

As will be understood by those skilled in the art, the assembly 10 can also include a protection member formed of resilient material positioned between the first rupture member 22 and the sealing member 24. Such a protection member prevents sharp edges formed in the rupture member 22 from abrading and damaging the sealing member 24 during handling and installation and in operation. The use of and an example of such a protective member are disclosed in U.S. Pat. No. 2,953,279 issued on Sep. 30, 1960 to Coffman, which is incorporated herein by reference.

The assembly 10 will rupture in the manner described above when the pressure of the pressurized fluid exerted on the assembly 10 rises relatively slowly to an overpressure condition, i.e., a pressure equal to or slightly greater than the predetermined rupture pressure of the first rupture member 22. That is, the pressure increase from a pressure level below the predetermined rupture pressure of the rupture member 22 to a pressure level equal to or slightly greater than such predetermined rupture pressure must be slow enough that the pressure increase is communicated to and independently exerted on the sealing member 24 and first rupture member 22. The pressure increase is communicated to the sealing member 24 and first rupture member 22 by the flow of pressurized fluid through the torturous path provided by the slits 44 and apertures 50 of the second rupture member 26, the slits 58 and 60 of the first and second flow restricting members 28 and 30 and the slots 66 of the support member 32.

When a momentary pressure surge is experienced in the vessel or system being protected whereby the pressure communicated to the composite rupture disk assembly 10 momentarily exceeds the predetermined rupture pressure of the first rupture member 22 thereof, the flow of pressurized fluid through the assembly 10 is restricted and relatively slow. That is, after the pressurized fluid flows through the slots 66 of the member 32, it must flow through the slit 60 of the member 30, between the members 30 and 28 for a short distance and then through the slit 58 of the member 28. The pressurized fluid next flows into the annular space 31 between the annular spacer member 25 and the cylindrical support member 27 by way of the slits 52 and apertures 57 of the rupture member 26. Prior to when pressurized fluid reaches the annular space 31, the overpressure condition caused by the momentary surge will be substantially simultaneously exerted on both the first and second rupture members 22 and 26 whereby the assembly 10 will not rupture. That is, when a momentary pressure surge is exerted on the assembly 10 and pressurized fluid begins its relatively slow flow through the assembly 10 as described above, the pressure surge substantially instantaneously causes the flexible members 30 and 28 to press against each other and against the rupture member 26. The rupture member 26 in turn presses against the cylindrical support member 27 which supports it and presses against the resilient sealing member 24. The resilient sealing member in turn presses against the rupture member 22. Because the force of the pressure surge is received by the rupture members 26 and 22 substantially simultaneously, the force required to rupture them is the sum of the rupture pressures of the members 26 and 22 rather than the rupture pressure of only the rupture member 22.

The term "momentary pressure surge" is thus used herein to mean a surge in pressure to a level above the predetermined rupture pressure of the first rupture member 22 which lasts for a time period less than the time required for the resulting flow of pressurized fluid to reach and independently exert the full pressure increase on the first rupture member 22. The rupture disk assembly 10 does not rupture during such a momentary pressure surge because the time required for the pressurized fluid to flow through the torturous path provided by the assembly 10 and to fill the volume created by the space 31 within the assembly 10 is greater than the duration of the momentary pressure surge. More specifically, because the flow of pressurized fluid to the sealing member 24 is restricted by the relatively small openings in the second rupture member 26, the first and second flow restricting members 28 and 30 and the support member 32 and the pressurized fluid must fill the space 31 before it can be independently exerted on the rupture member 22, the momentary pressure required to rupture the assembly 10 is greater than that required to rupture the first rupture member 22. That is, during the momentary pressure surge, the rupture pressure of the assembly 10 is approximately doubled because the pressure is communicated to both rupture members substantially simultaneously.

Referring now to FIGS. 6–8, an alternate embodiment of the composite rupture disk assembly of the present invention is illustrated and generally designated by the numeral 70. The assembly 70 is shown in FIG. 6 clamped between inlet and outlet annular supporting members 72 and 74, respectively. The inlet supporting member 72 is connected to a conduit 76 which is in turn connected to the vessel or system being protected, and the outlet supporting member 74 is connected to an outlet conduit 78. In the form shown in FIG. 6, the annular supporting members 72 and 74 are pipe flanges which are clamped together with the composite rupture disk assembly 70 inbetween by a plurality of studs 80 and nuts 82.

Like the assembly 10 described above, the composite rupture disk assembly 70 includes an annular positioning member 84, a first perforated rupture member 86, a resilient sealing member 88 and a second rupture member 90. However, instead of a pair of flow resisting members and support member, the assembly 70 includes a single flow restricting member 92. The flow restricting member 92 is formed of rigid material and includes a central dome portion 94 and a flat annular flange portion 96. The diameter of the flow restricting member 92 can be greater than the diameters of the other members of the assembly 70 whereby a portion 98 can be folded over the peripheral edges of the other members to clamp the assembly together. The dome portion 94 of the flow restricting member 92 is centrally positioned and has a convex side facing the pressurized fluid and a concave side facing the second rupture member 90.

The first rupture member 86 is identical to the first rupture member 22 of the assembly 10 described above in that it includes a plurality of slits 100 formed therein radiating outwardly from a solid central portion 104 thereof and defining a plurality of sector shaped portions 106 therein. Apertures 102 can optionally be formed in the member 86 at the ends of the slits 100 as shown.

The resilient sealing member 88 of the assembly 70 is identical to the sealing member 24 of the assembly 10 described above, and the second rupture member 90 is identical to the second rupture member 26 of the assembly 10 described above. The second rupture member 90 includes a plurality of slits 108 therein radiating outwardly from a solid central portion 110 and defining a plurality of sector shaped portions therein. Apertures 112 are disposed in the member 90 at the ends of the slits 108.

The flow restricting member 92 includes a centrally positioned opening 114 which is shown in FIG. 8 in the form of a small slot. In addition, the member 92 includes a pair of arcuate slits 118 formed therein which define a hinged circular blow-out area therein. That is, the area 118 between two adjacent ends of the arcuate slits define a hinge which retains the blow-out portion connected to the member 92. The area 120 between the other two adjacent ends of the slits 116 defines a rupture tab which tears when the member 92 ruptures. The ends of the slits 116 can optionally include apertures 122 as illustrated in FIG. 8. As will be understood, the arcuate slits 116 can be formed in the dome portion 94 of the flow restricting member 92 or they can be formed in the annular flat flange portion 96 adjacent to the dome portion 94.

The operation of the composite rupture disk assembly 70 is similar to the operation of the assembly 10 described above except that the flow restriction and time delay in communication of fluid pressure to the first rupture member 86 is brought about by the flow restricting openings in the member 92 in combination with the increased volume of space provided within the assembly 70 by the dome shape of the member 92. That is, during a relatively slow build-up of fluid pressure in the vessel or system being protected, pressurized fluid flows through the slot 114, slits 116 and apertures 122 of the flow restricting member 92 into the space between the concave side of the member 92 and the second rupture member 90. The pressurized fluid then flows through the slits 108 and apertures 112 of the second rupture member 90 to the flexible sealing member 88. When the fluid pressure exerted on the sealing member 88 exceeds the rupture pressure of the first rupture member 86, the first rupture member ruptures followed by the sealing member 88, the second rupture member 90 and the flow restricting member 92. The flow restricting member 92 ruptures by the tearing of the area 120 between the apertures 122 followed by the movement of the circular blow-out portion defined by the slits 116 through the opening in the assembly 70. The blow-out portion remains connected to the flow restricting member 92 by the hinge area 118.

When a momentary pressure surge is experienced in the vessel or system being protected whereby pressure rapidly increases to an overpressure condition and subsides, the composite rupture disk assembly 70 does not rupture. This is because the pressurized fluid flow caused by the surge is restricted by the openings in the flow restricting member 92, i.e., the slot 114, the slits 116 and the apertures 122 in combination with the additional time required for the pressurized fluid to fill the volume between the flow restricting member 92 and the second rupture member 90. Because of the restriction in flow and time delay, the pressure acts on both the first and second rupture members simultaneously whereby the pressure required to rupture the assembly 70 is the sum of their rupture pressures.

Referring now to FIG. 9 yet another alternate form of the composite rupture disk assembly of the present invention is illustrated and designated by the numeral 130. The assembly 130 includes an optional positioning member 132, a perforated rupture member 134, a resilient sealing member 136 and a flow restricting member 138. A peripheral portion of the flow restricting member 138 is utilized to clamp the members together. The assembly 130 operates in the same manner as described above except that the flow restricting member 138 functions both to restrict pressurized fluid flow into the assembly 130 and as a second rupture member. The member 138 includes a single flow restricting opening 140 therein. When a momentary pressure surge is experienced, the pressurized fluid flow into the assembly is restricted whereby a pressure level equal to the rupture pressure of the rupture member 134 and the rupture pressure of the member 138 must be exceeded before rupture of the assembly 130 occurs. Like the assemblies 10 and 70 described above, when the pressure increase is relatively slow, the overpressure condition is communicated to the rupture member 134 alone whereupon it and the other members of the assembly rupture at the predetermined rupture pressure of the rupture member 134.

Figure 10:
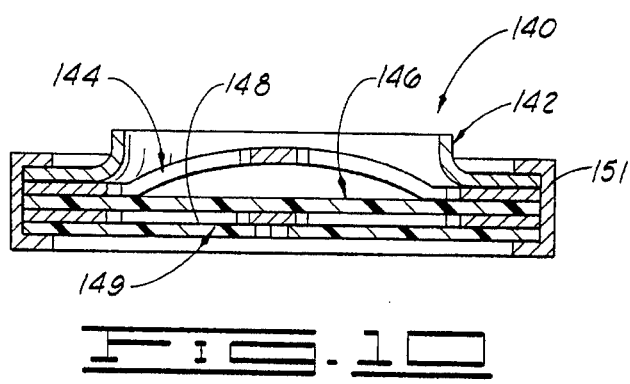
FIG. 10 is a side cross-sectional view of yet another alternate form of rupture disk assembly of the present invention.

Referring to FIG. 10, still another alternate embodiment of the composite rupture disk assembly of the present invention is illustrated and generally designated by the numeral 140. The composite rupture disk assembly 140 includes an optional positioning member 142, a first perforated rupture member 144, a resilient sealing member 146, a second perforated rupture member 148 and a flow restricting member 149. The members of the assembly are clamped together by means of a separate clamping member 151 which is folded over the peripheral ends of the other members of the assembly.

The composite rupture disk assembly 140 operates in the same manner as described above. However, the first rupture member 144 includes a central dome portion with the concave side thereof facing the sealing member 146. The dome in the first rupture member 144 provides additional volume within the assembly 140 which increases the time delay in communicating a pressure increase to only the first rupture member 144.

Figure 11:
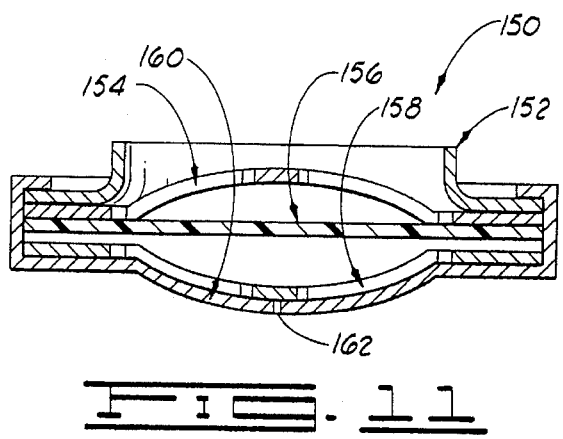
FIG. 11 is a side cross-sectional view of still another alternate form of rupture disk assembly of the present invention.

Referring to FIG. 11, still another alternate embodiment of the present invention is shown and generally designated by the numeral 150. The assembly 150 includes an optional positioning member 152, a first domed perforated rupture member 154, a resilient sealing member 156, a second domed perforated rupture member 158 and a domed flow restricting member 160 which is utilized to clamp the parts of the assembly 150 together. The domed first and second rupture members 154 and 158 have their concave sides facing the sealing member 156 whereby a space of relatively large volume is formed within the assembly 150.

In operation of the assembly 150, a slow pressure increase causes the pressurized fluid flow through a single opening 162 in the flow restricting member 160, through apertures and slits in the second rupture member 158 and into the space within the assembly 150 against the resilient sealing member 156 whereby it is moved into contact with the concave side of the first rupture member 154. When the pressure communicated to the first rupture member 154 exceeds its predetermined rupture pressure, rupture of the assembly occurs. When a momentary pressure surge takes place, the resulting pressurized fluid flow is restricted and a larger volume is required to exceed the predetermined pressure of the first rupture member 154 alone.

Figure 12:
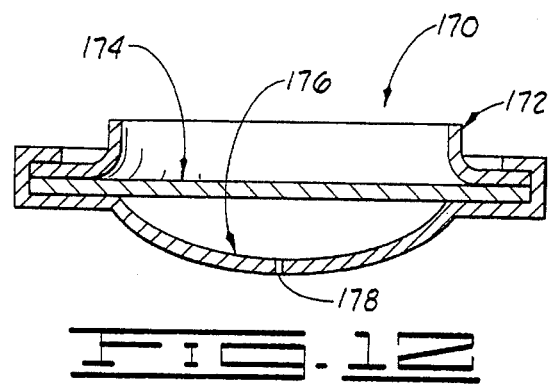
FIG. 12 is a side cross-sectional view of a further alternate form of the rupture disk assembly of the present invention.

Referring now to FIG. 12, still a further embodiment of the composite rupture disk assembly of the present invention is illustrated and generally designated by the numeral 170. The assembly 170 is comprised of an optional positioning member 172 and a solid rupture disk 174 formed of rigid material which can be flat as shown or include a centrally positioned dome having the convex surface thereof facing the positioning member 172. A combined rupture and flow restricting member 176 is provided which can be flat or include a central dome portion as shown positioned with the concave surface facing the rupture disk 174 and including a pressurized fluid flow restricting opening 178 therein.

In operation, the composite rupture disk assembly 170 operates in the same manner as do the various assemblies described above. That is, when a slow pressure increase to an overpressure condition is experienced, the resulting pressurized fluid flow travels through the opening 178 into the space within the assembly 170 and into contact with the rupture disk 174 whereby the overpressure condition is communicated to the rupture disk 174 alone. As a result, the rupture disk 174 ruptures followed by the rupture of the member 176 providing pressure relief to the vessel or system being protected. When a momentary surge in pressure occurs whereby a momentary overpressure condition is experienced, the resulting pressurized fluid flow is restricted and a pressure approximately equal to the sum of the predetermined rupture pressures of the member 174 and member 176 is required to rupture the assembly 170.

As will be understood by those skilled in the art and as mentioned above, the various embodiments of this invention including a resilient sealing member can also include protection members to prevent abrasion damage to the sealing member. In addition, a variety of different parts and arrangements of such parts can be utilized in accordance with this invention which along with changes to the parts and arrangements described herein will suggest themselves to those skilled in the art. Such different parts and arrangements and changes are encompassed within the spirit of this invention as defined by the appended claims.

What is claimed is:

1. A momentary pressure surge resistant rupture disk assembly adapted to be sealingly clamped across a pressurized fluid containing passageway comprising:

a first rupture member having a predetermined rupture pressure;

a second rupture member having a predetermined rupture pressure and having at least one opening therein for allowing a restricted pressurized fluid flow therethrough, said second rupture member facing said pressurized fluid;

means for providing a space for containing pressurized fluid within said assembly and for supporting said second rupture member against said first rupture member during a momentary pressure surge disposed between said first and second rupture members; and at least one flow restricting member positioned on the side of said second rupture member facing said pressurized fluid having at least one opening therein for further restricting pressurized fluid flow therethrough and through said second rupture member.

2. The assembly of claim 1 wherein said means for providing a space within said assembly and supporting said second rupture member against said first rupture member are comprised of:

a spacer member for providing a space within said assembly disposed between said first and second rupture members; and a support member disposed within said space having a size such that said second rupture member is supported against said first rupture member when a momentary pressure surge is exerted on said second rupture member.

3. The apparatus of claim 1 wherein said first rupture member is perforated and said rupture disk assembly further comprises a resilient sealing member positioned between said first rupture member and said means for providing a space within said assembly and supporting said second rupture member against said first rupture member.

4. The apparatus of claim 1 wherein said second rupture member has a predetermined rupture pressure which is substantially equal to or lower than the predetermined rupture pressure of the first rupture member.

5. The apparatus of claim 3 wherein said first rupture member includes slits formed therein radiating outwardly from a central portion thereof and defining a plurality of sector shaped portions so that upon rupture tearing occurs between the inner ends of said slits whereby said rupture member opens without fragmentation.

6. The apparatus of claim 5 wherein said first rupture member includes apertures formed therein at the interior ends of said slits.

7. The apparatus of claim 1 or 3 wherein said second rupture member includes slits formed therein radiating outwardly from a central portion thereof and defining a plurality of sector shaped portions so that upon rupture tearing occurs between the inner ends of said slits whereby said rupture member opens without fragmentation.

8. The apparatus of claim 7 wherein said second rupture member includes apertures formed therein at the interior ends of said slits.

9. A momentary pressure surge resistant rupture disk assembly adapted to be sealingly clamped across a pressurized fluid containing passageway comprising:

a first rupture member having a predetermined rupture pressure;

a second rupture member having a predetermined rupture pressure and having at least one opening therein for allowing a restricted pressurized fluid flow therethrough, said second rupture member facing said pressurized fluid;

a spacer member for providing a space for containing pressurized fluid within said assembly disposed between said first and second rupture members;

a support member disposed within said space having a size such that said second rupture member is supported against said first rupture member when a momentary pressure surge is exerted on said second rupture member; and a first flow restricting member positioned on the side of said second rupture member facing said pressurized fluid having at least one opening therein for further restricting pressurized fluid flow therethrough and through said second rupture member.

10. The assembly of claim 9 wherein said first rupture member is perforated and said rupture disk assembly further comprises a resilient sealing member positioned between said first rupture member and said means for providing a space within said assembly and supporting said second rupture member against said first rupture member.

11. The assembly of claim 10 wherein said second rupture member has a predetermined rupture pressure which is substantially equal to or lower than the predetermined rupture pressure of the first rupture member.

12. The assembly of claim 11 wherein said first rupture member includes slits formed therein radiating outwardly from a central portion thereof and defining a plurality of sector shaped portions so that upon rupture tearing occurs between the inner ends of said slits whereby said rupture member opens without fragmentation.

13. The assembly of claim 12 wherein said first rupture member includes apertures formed therein at the interior ends of said slits.

14. The assembly of claim 13 wherein said second rupture member includes slits formed therein radiating outwardly from a central portion thereof and defining a plurality of sector shaped portions so that upon rupture tearing occurs between the inner ends of said slits whereby said rupture member opens without fragmentation.

15. The assembly of claim 14 wherein said second rupture member includes apertures formed therein at the interior ends of said slits.

16. The assembly of claim 15 wherein said support member is bonded to said resilient sealing member.

17. The assembly of claim 16 wherein said support member is cylindrical.

18. The assembly of claim 17 wherein said first and second rupture members are circular and said spacer member is of an annular shape.

19. The assembly of claim 18 which further comprises a second flow restricting member positioned on the side of said first flow restricting member facing said pressurized fluid and having at least one opening therein.

20. The assembly of claim 19 wherein said first and second flow restricting members are resilient and said openings therein are arcuate slits.

21. The assembly of claim 20 which further comprises a support member positioned on the side of said second flow restricting member facing said pressurized fluid and having at least one opening therein.

22. The assembly of claim 21 which further comprises a positioning member positioned on the side of said first rupture member which faces away from said pressurized fluid.

* * * * *